W. M. PAGE.
COMPOUND METAL AND PROCESS OF MAKING THE SAME.
APPLICATION FILED JULY 13, 1908.
949,837.
Patented Feb. 22, 1910.
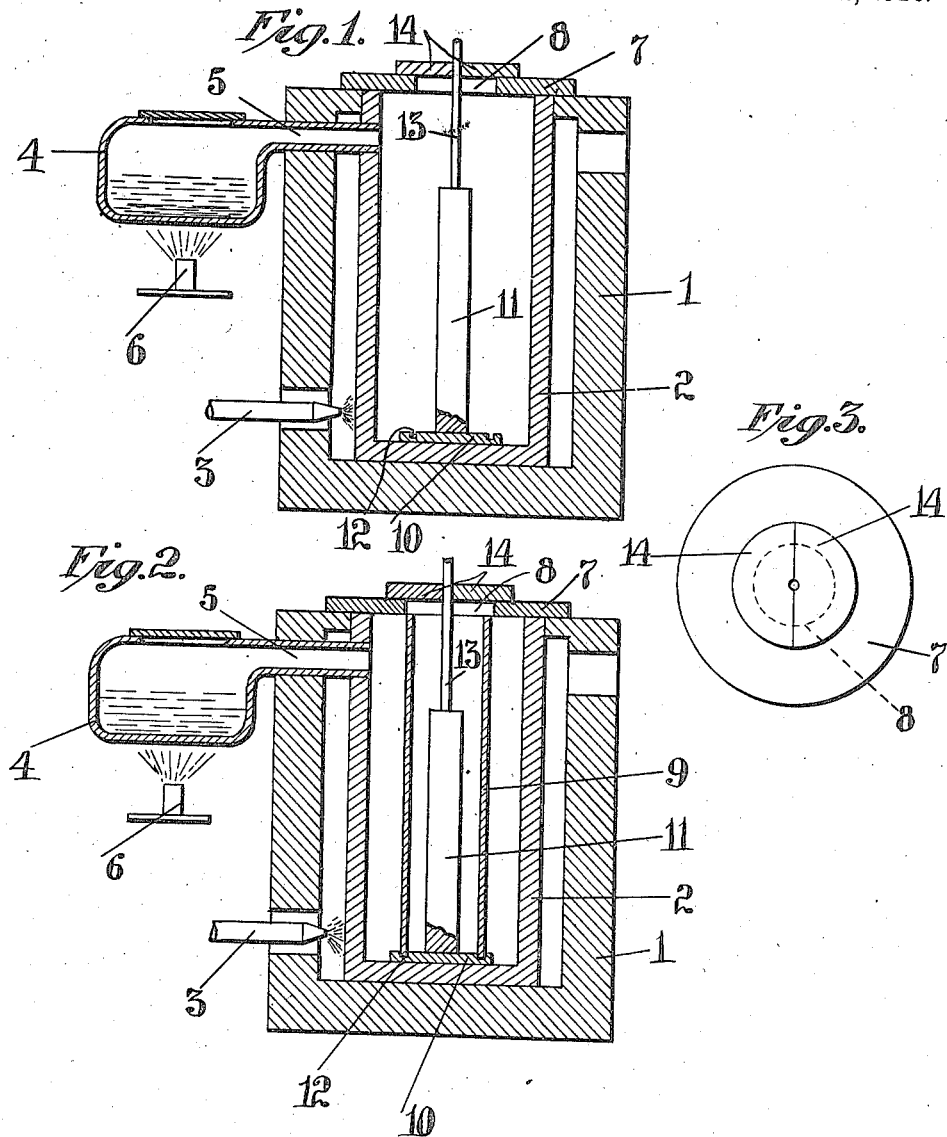
Attest:
by
Inventor:
William M. Page
Attys

UNITED STATES PATENT OFFICE.

WILLIAM M. PAGE, OF PHILADELPHIA, PENNSYLVANIA, ASSIGNOR TO DUPLEX METALS COMPANY, OF NEW YORK, N. Y., A CORPORATION OF NEW YORK.

COMPOUND METAL AND PROCESS OF MAKING THE SAME.

949,837.  Specification of Letters Patent.  Patented Feb. 22, 1910.

Application filed July 13, 1908. Serial No. 443,339.

*To all whom it may concern:*

Be it known that I, WILLIAM M. PAGE, a citizen of the United States, residing at Philadelphia, county of Philadelphia, and State of Pennsylvania, have invented a certain new and useful Compound Metal and Process of Making the Same, of which the following is a specification.

This invention relates to compound metals and processes of making same; and comprises bodies of compound metal comprising layers of ferrous metal inseparably, permanently and firmly united to layers of unlike, high melting metals, preferably a copperlike metal, such as copper itself or a cupriferous metal, with the aid of a linking unlike, low-melting, comparatively volatile metal, or of an alloy thereof with the ferrous metal; and it also comprises a method of making such compound metals wherein bodies of clean, metallic-surfaced ferrous metal are fumed with vapors of low-melting, comparatively volatile metal, thereby probably producing a superficial alloying of a particular type and also producing a superficial heating to a comparatively high temperature without destruction of a metallic surface, such fumed metals being afterward united to layers of non-ferrous, high melting metal by bringing such unlike metal in contact therewith in a molten state; all as more fully hereinafter set forth and as claimed.

Iron and its various alloys and compounds of a metallic nature, such as the various steels, do not readily unite with or weld to unlike, high melting metals of a different chemical and physical type, such as copper and the copperlike metals, such as silver and gold. And the same is true of the ironlike metals, nickel and cobalt, manganese, etc. Good unions between metals of the two groups may be produced by special expedients, as in the methods of Joh. Ferreol Monnot, Patent No. 853,716, but the ordinary methods of welding or uniting the metals of one such group among themselves do not give good or permanent unions between metals of the different groups. This difficulty of union is further accentuated by the fact that in practice with ordinary methods of heating it is difficult to bring iron and ironlike metals to the high temperatures necessary to produce weld-like unions with clean, perfectly metallic surfaces, iron and like metals being prone to oxidize and, when heated in reducing flames, to become sooted, such metals having a strong affinity for carbon. Clean metallic surfaces at a high temperature are imperatively necessary in producing any firm, cohesive union between iron or ironlike metals and metals of the copper group. Iron may be heated in crucibles and the like when surrounded with atmospheres of neutral and indifferent gases, such as carbon monoxid or nitrogen, producer gas, etc., but this involves more or less heating by convection of such gases, and their low density and specific heat render this a slow process.

In the present invention, I have devised a cheap, simple and ready method of producing the desired type of union between metals of the two classes, and of bringing such ironlike metals up to any temperature desired without destruction of a metallic surface.

Iron and metals of the iron group while not readily uniting with copper and highmelting metals of the copper class, do unite comparatively readily with various lowmelting and comparatively volatile metals of the zinc and tin classes, while, on the other hand these low-melting metals also unite even more readily with metals of the copper class. This fact is utilized in the present process.

Iron and steel are frequently coated with a substantial layer of zinc or tin by various dipping processes to produce the ordinary galvanized and tinned articles. This coating, however, is applied to the finished or nearly finished article; it being impracticable to coat a steel billet with such a substantial coating of these metals and work it down to wire or sheets, as can be done with suitable high-melting metals by the Monnot coating processes, zinc and tin being too fusible, volatile and oxidizable to withstand the comparatively high temperatures necessary in working steel. Nor are the high-zinc and high-tin alloys of iron produced in galvanizing and tinning sufficiently malleable to stand extension to any great extent.

In the present invention iron and iron-like metals are first given a clean metallic surface by any suitable means, as by sandblasting, and are then fumed by exposure to vapors of a volatile oxidizable metal, such as zinc. The iron or steel billet or object may be preliminarily heated before the fuming in any manner of heating not impairing the metallic surface, but zinc vapors being dense and hot quickly give the ferrous metal a superficial temperature as high as is necessary. The conduction of heat by ferrous metals being relatively slow, this heating may be quite superficial, the surface of the billet being at a high temperature while its core may not be very hot. As oxygen and zinc vapor cannot coexist, in this heating operation the ferrous metal cannot become oxidized. Iron thus treated with zinc vapors takes up some zinc superficially without forming a real coating layer of such zinc, becoming superficially impregnated with a minimal amount thereof; possibly from the formation of a high-iron alloy not enough zinc is taken up to endanger subsequent operations. An iron billet thus heated on the one hand is given the necessary superficial temperature to allow it to be contacted with molten copper, etc., while preserving a clean metallic surface (a matter of some difficulty by most heating methods) and on the other hand it is rendered more disposed to unite with such unlike metals as copper and the copper group so that lower-temperature coating metal may be employed. Zinc, as stated, has a disposition to unite both with the ironlike and the copperlike metals, and the minimal amount of zinc in the surface of the so-treated billet much facilitates union with copper, brass and the cupriferous metals generally, as well as with gold and silver, and even aluminum, the zinc-impregnated iron of the surface acting as a linking nexus between the iron and the other metal. This fact is very convenient in forming brass-clad steel by uniting a fumed ferrous metal with molten brass. Brass does not well withstand the high temperatures necessary in uniting it with iron direct to form a weld-union. The amount of zinc deposited in the superficies of the ferrous metal billet is too small to affect the malleability injuriously. Any iron-zinc alloy formed is formed at the temperature of vaporized zinc, and so is naturally stable at such temperature and the zinc does not revolatilize on contact with the coating metal as would happen with a substantial coating of zinc.

The heating and impregnation of the iron may be done in any convenient apparatus with any convenient source of zinc vapors. A casing of suitable material may for instance have its bottom covered with a layer of very hot melted zinc, and may then be heated. Zinc vapor being very heavy, the casing will fill with a body of zinc vapor extending to a point near the top, and into this body the billet or the like may be lowered. Heating may be by transmitted fire heat, by electric heating or by any other suitable means. The supply of metal may be replenished with ordinary pig zinc or with melted zinc cast in. The billet is allowed to remain in the zinc vapor for the length of time necessary for heating or impregnation or both.

Zinc dust or "blue zinc" may be used as a source of the zinc vapor, being mixed with a little carbon to reduce oxid. Or zinc oxid mixed with carbon may be directly employed. Other comparatively volatile metals such as aluminum or tin may be employed with the same results as zinc, but they require, and impart, much higher temperatures. Antimony and bismuth may also be used, but are less suitable.

In the accompanying illustration I have shown, more or less diagrammatically, one of the many types of apparatus which may be used in performing the described process.

In this showing: Figure 1 shows a central vertical section of the apparatus as arranged for treating articles to be coated with metallic fumes; Fig. 2 shows a similar view of the same parts after the introduction of the casing to form the mold surrounding said object. Fig. 3 shows a top view of a portion of the structure shown in Fig. 1.

In the drawings, 1 designates a heating furnace of suitable construction and 2 a chamber of suitable material, preferably refractory material, within said furnace and adapted to be heated by suitable means, as for example a flame jet from a burner 3.

4 designates a vessel adapted to contain molten readily vaporizable metal such as zinc; said chamber 4 connected by a flue 5 with the interior of chamber 2. This chamber 4 is arranged to be heated by suitable means, as for example, a burner 6. Chamber 2 is provided with a cover 7 in which is an opening 8 for the passage of the article to be coated and a casing to form the sides of the mold. In Fig. 2, 9 designates this casing and 10 a bottom piece therefor, which bottom piece may conveniently be removably attached to the article 11 to be coated. This bottom piece 10 has in it a groove 12 adapted to receive the lower edge of the casing 9.

The manner of carrying on the operation is as follows: The article 11 to be coated is introduced into chamber 2, which chamber is filled with the vapor of the metal from chamber 4, these vapors serving to heat the surface of the article 11 and also to protect such surface against oxidation, for free oxygen cannot exist in the presence of vapors of zinc, tin, bismuth, antimony, etc. When the surface of this object 11 has been heated to a sufficient degree by the vapors in this manner, said vapors will combine with its surface as previously stated, forming a coating or impregnation thereon of an inseparable character with which coating the main coating metal (copper, brass, etc.) to be cast against such surface subsequently, will combine readily. Or, the object 11 may be heated in another furnace under conditions precluding oxidation and may be transferred to the vapor filled chamber 2 under conditions precluding oxidation, in the manner and by the means described and illustrated in the patent to John F. Monnot, No. 853,716, dated May 14, 1907. The article 11 having been sufficiently acted upon by the metallic vapors in chamber 2, the casing 9 is introduced into the mold and caused to make a tight fit with the bottom plate 10, and then molten metal to form the main coating is poured into the space between the object 11 and the sides of this chamber 9, the molten metal so cast combining with the coating or impregnated metal formed, on the surface of object 11 by the metallic vapor and so producing the desired coating. Preferably the molten metal so cast is cast into the casing 9 through a substantial thickness of molten wiping material as described in the Monnot application Sr. No. 391,673, filed Sept. 6, 1907, whereby the molten metal is free from entrained and occluded gases, oxid impurities, etc., and a casting of dense uniform character is assured.

For convenience in handling the article to be coated, I customarily provide it with a porter bar 13. To cover the opening in the cover 7 through which the article to be coated and the casing 9 are introduced, I provide a supplemental two part cover 14.

What I claim is:—

1. The process of making clad metal articles which comprises fuming and heating a ferrous metal with the vapors of a low-melting metal and subsequently coating the fumed surface with a high-melting non-ferrous metal.

2. The process of making clad metal articles which comprises producing a clean metallic surface on a ferrous metal object, fuming and heating said surface with the vapors of a low-melting metal, contacting said surface with a molten high-melting non-ferrous metal and allowing said molten metal to solidify thereagainst.

3. The process of making clad metal articles which comprises fuming and heating a ferrous metal surface with the vapors of a low-melting metal and subsequently coating the fumed surface with a cupriferous metal.

4. The process of making clad metal articles which comprises fuming a ferrous metal surface with the vapors of a low-melting metal and subsequently coating the fumed surface with a copper alloy.

5. The process of making clad metal articles which comprises fuming a ferrous metal surface with the vapors of a low-melting metal and subsequently coating the fumed surface with brass.

6. The process of making clad metal articles which comprises heating and fuming the surface of a ferrous metal object with zinc vapors, and subsequently coating the fumed surface with a high-melting non-ferrous metal.

7. The process of making clad metal articles which comprises producing a clean metallic surface on a ferrous metal object, fuming and heating said surface with zinc vapors, contacting said fumed surface with a molten high-melting metal and allowing such molten metal to solidify thereagainst.

8. The process of making clad metal articles which comprises producing a clean metallic surface on a ferrous metal object, fuming and heating such ferrous metal with zinc vapors, and subsequently coating the fumed surface with a cupriferous metal.

9. The process of making clad metal articles which comprises producing a clean metallic surface on a ferrous metal object, fuming and heating such ferrous metal with zinc vapors, and subsequently coating the fumed surface with a copper alloy.

10. The process of making clad metal articles which comprises producing a clean metallic surface on a ferrous metal object, fuming and heating such ferrous metal with zinc vapors, and subsequently coating the fumed surface with brass.

11. The process of producing clad metals which comprises producing a clean metallic surface on a ferrous metal object, heating said surface while preserving its metallic character by contacting with hot vapors of an oxidizable metal and thereafter contacting molten coating metal with such heated surface.

12. The process of producing clad metals which comprises producing a clean metallic surface on a ferrous metal object, placing said object in a heating chamber containing vapors of oxidizable metal until such surface is sufficiently heated, placing a mold casing next such heated surface and casting molten coating metal between the mold casing and the heated surface.

13. The process of producing clad metals which comprises producing a clean metallic surface an a ferrous metal object, placing said object in a heating chamber containing hot zinc vapors till such surface is sufficiently heated, placing a mold casing next such heated surface and casting molten coating metal between the mold casing and the heated surface.

14. A clad metal article comprising a body of ferrous metal and a body of high melting non-ferrous metal united by an intermediate nexus formed by the action of metallic vapor on a solid mass of one of said metals.

15. A clad metal article comprising a body of ferrous metal and a body of high melting non-ferrous metal united by an intermediate nexus formed by the action of metallic vapor on the ferrous metal.

16. A clad metal article comprising a body of ferrous metal and a body of high melting non-ferrous metal united by an intermediate nexus formed by the action of vapor of a low melting metal on a solid mass of one of said metals.

17. A clad metal article comprising a body of ferrous metal and a body of high melting non-ferrous metal united by an intermediate nexus formed by the action of vapor of a low melting metal on the ferrous metal.

18. A clad metal article comprising a body of ferrous metal and a body of high melting non-ferrous metal united by an intermediate nexus formed by the action of zinc vapors on a solid mass of one of said metals.

19. A clad metal article comprising a body of ferrous metal and a body of high melting non-ferrous metal united by an intermediate nexus formed by the action of zinc vapors on the ferrous metal.

20. A clad metal article comprising a substantial layer of a ferrous metal united with a substantial layer of a cuprous metal, there being a minute amount of zinc impregnating the surfaces of said united metals at the line of joinder.

In testimony whereof I affix my signature, in the presence of two witnesses.

WILLIAM M. PAGE.

Witnesses:
W. J. REED,
W. M. CARR.